(12) United States Patent
Suga et al.

(10) Patent No.: US 7,678,875 B2
(45) Date of Patent: *Mar. 16, 2010

(54) METHOD FOR PRODUCING POLYCARBONATE COPOLYMER AND POLYCARBONATE COPOLYMER

(75) Inventors: Koichi Suga, Chiba (JP); Yasuhiro Ishikawa, Chiba (JP)

(73) Assignee: Idemitsu Kosan Co., Ltd., Tokyo (JP)

(*) Notice: Subject to any disclaimer, the term of this patent is extended or adjusted under 35 U.S.C. 154(b) by 405 days.

This patent is subject to a terminal disclaimer.

(21) Appl. No.: 11/571,020

(22) PCT Filed: Jun. 30, 2005

(86) PCT No.: PCT/JP2005/012136

§ 371 (c)(1),
(2), (4) Date: Dec. 20, 2006

(87) PCT Pub. No.: WO2006/004022

PCT Pub. Date: Jan. 12, 2006

(65) Prior Publication Data

US 2008/0300378 A1    Dec. 4, 2008

(30) Foreign Application Priority Data

Jul. 1, 2004    (JP)    ............................. 2004-195812

(51) Int. Cl.
*C08G 63/02*    (2006.01)

(52) U.S. Cl. ................ 528/195; 524/398; 524/409; 524/412; 524/540; 524/611; 525/242; 525/451; 525/462; 525/464; 528/176; 528/196; 528/198; 528/271; 528/281; 528/282

(58) Field of Classification Search ................. 524/394, 524/409, 412, 540, 611; 525/242, 451, 462, 525/464; 528/176, 195, 196, 198, 271, 272, 528/281, 282; 560/61

See application file for complete search history.

(56) References Cited

U.S. PATENT DOCUMENTS

| 4,663,399 A | 5/1987 | Peters | |
|---|---|---|---|
| 2008/0221295 A1* | 9/2008 | Ishikawa et al. | ............ 528/176 |
| 2008/0287610 A1* | 11/2008 | Ishikawa et al. | ............ 525/391 |
| 2009/0093583 A1* | 4/2009 | Kawato et al. | ............ 524/502 |

FOREIGN PATENT DOCUMENTS

| JP | 60-168720 | 9/1985 |
|---|---|---|
| JP | 62-79222 | 4/1987 |
| JP | 05-339359 | 12/1993 |
| JP | 2000-186137 | 7/2000 |
| JP | 2005-232286 | 9/2005 |

OTHER PUBLICATIONS

U.S. Appl. No. 10/587,974, filed Aug. 3, 2006, Ishikawa, et al.

* cited by examiner

*Primary Examiner*—Terressa M Boykin
(74) *Attorney, Agent, or Firm*—Oblon, Spivak, McClelland, Maier & Neustadt, L.L.P.

(57) ABSTRACT

A method for producing a PC copolymer with improved productivity is provided. The PC copolymer has a specific structure and the method uses a diester diol-containing monomer as a raw material. The polycarbonate copolymer is produced by reacting a diester diol-containing monomer, a divalent phenol, and a carbonate precursor by interfacial polymerization, wherein the diester diol-containing monomer is a product of reaction between a hydroxybenzoic acid or an esterified product thereof and a polyalkylene glycol, wherein the esterification degree of hydroxyl groups of the polyalkylene glycol is 50 to 90 mol %.

7 Claims, 1 Drawing Sheet

US 7,678,875 B2

METHOD FOR PRODUCING POLYCARBONATE COPOLYMER AND POLYCARBONATE COPOLYMER

CROSS REFERENCE TO RELATED APPLICATIONS

This application is the U.S. National Stage of International Application No. PCT/JP05/012136, filed Jun. 30, 2005. This application claims priority to Japanese Patent Application No. JP 2004-195812, filed Jul. 1, 2004.

TECHNICAL FIELD

The present invention relates to a method for producing a polycarbonate copolymer having a specific structure with improved productivity, by interfacial polymerization using a diester diol-containing monomer and a divalent phenol as raw materials, and a polycarbonate copolymer produced by the present method.

BACKGROUND ART

A polycarbonate (hereinafter, may be called as PC) resin consisting of an aromatic polycarbonate unit and an aliphatic polyether unit has been known as a resin having an excellent property in toughness. For example, a method has been disclosed for copolymerizing a phenol-modified diol (diester diol) which is used as a co-monomer and is derived from p-hydroxybenzoic acid or its alkylester or an acid chloride and a diol (for example, refer to Patent Document 1). Specifically, a PC copolymer has been proposed, which is obtained by copolymerizing a co-monomer of tetramethylene glycol (molecular weight: 2,000)-bis(4-hydroxybenzoate) or polyethylene glycol (molecular weight: 8,000)-bis(4-hydroxybenzoate). The PC copolymer using these diester diols can be produced by conventional interfacial polymerization, however, the following problems have been encountered: a PC copolymer with high purity is not easy to obtain because in the washing step of polymerization solution the methylene chloride phase which contains the PC copolymer is poorly separated from the water phase which contains impurities; and productivity is lowered greatly when a PC copolymer with high purity is tried to be obtained.

In order to avoid the above problems, in the specification of Japanese Patent Application No. 2004-04293, the present applicant had proposed a method for producing a polycarbonate copolymer, where separation of the water phase from the methylene chloride phase after polymerization is improved by using a co-monomer which contains 500 ppm by mass or less of a hydroxybenzoic acid. However, separation of the PC copolymer in an acid- or water-washing process after polymerization is not necessarily satisfied, so that a still improved method has been requested.

Patent Document 1: Japanese Patent Application Laid-Open (JP-A) No. Shou62-79222.

DISCLOSURE OF INVENTION

Problems to be Solved by the Invention

The present invention has been made in view of the above circumstances. In a method for producing a PC copolymer having a specific structure using a diester diol and a divalent phenol as raw materials, it is an object of the present invention to provide a method for producing a PC copolymer with improved productivity, and a PC copolymer obtained by the method.

Means for Solving the Problems

The present inventors have made intensive studies so as to solve the above-mentioned problems, and as a result, have found that separation of a PC copolymer in an acid- or water-washing process after polymerization is greatly improved by using, among conventional diester diols, a diester diol having an esterification degree in a specific range as a raw material (co-monomer). Based on the above finding, the present invention have been accomplished.

Namely, the present invention provides a method for producing a polycarbonate copolymer and a polycarbonate copolymer, which are described below.

1. A method for producing a polycarbonate copolymer which is characterized in that a diester diol-containing monomer, a divalent phenol, and a carbonate precursor are reacted by interfacial polymerization, wherein the diester diol-containing monomer is a product of reaction between a hydroxybenzoic acid or an esterified product thereof and a polyalkylene glycol, wherein the esterification degree of hydroxyl groups of the polyalkylene glycol is 50 to 90 mol %;
2. The method for producing a polycarbonate copolymer as described in item 1, wherein the esterification degree is 75 to 90 mol %;
3. The method for producing a polycarbonate copolymer as described in item 1 or 2, wherein the hydroxybenzoic acid or the esterified product thereof is p-hydroxybenzoic acid or the esterified product thereof;
4. The method for producing a polycarbonate copolymer as described in item 1 or 2, wherein the hydroxybenzoic acid or the esterified product thereof is o-hydroxybenzoic acid or the esterified product thereof;
5. The method for producing a polycarbonate copolymer as described in any of items 1 to 4, wherein the amount of a hydroxybenzoic acid contained as an impurity in the diester diol-containing monomer is 0.05% by mass or less;
6. The method for producing a polycarbonate copolymer as described in any of items 1 to 5, wherein the amount of a hydroxybenzoate contained as an impurity in the diester diol-containing monomer is 1.0% by mass or less;
7. A polycarbonate copolymer produced by the method as described in any of items 1 to 6.

Effect of the Invention

According to the present invention in the method for producing a PC copolymer having a specific structure wherein a diester diol-containing monomer and a divalent phenol are used as raw materials, not only the production process can be made to be simplified and laborsaving, but also separation of a PC copolymer can be remarkably improved in an acid- or water-washing process after polymerization.

BEST MODE FOR CARRYING OUT THE INVENTION

Figure 1:
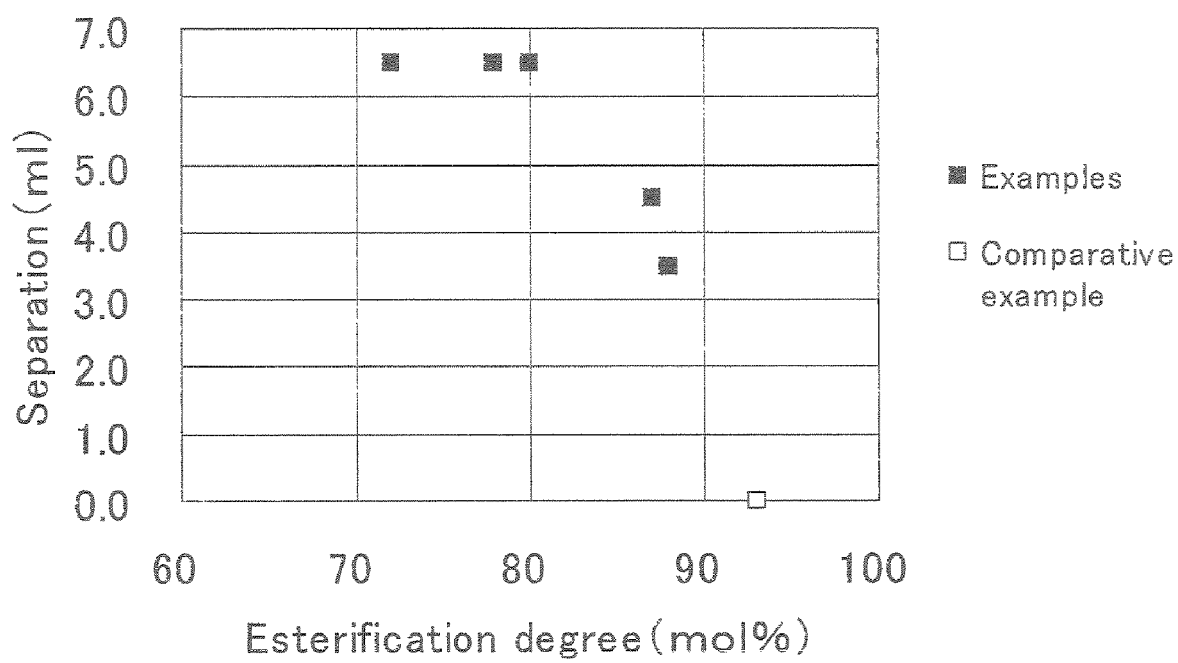
FIG. 1 is a graph showing separation of a polycarbonate copolymer from reaction solution in a production step of the polycarbonate copolymer.

The diester diol-containing monomer used in the method for producing a PC copolymer in the present invention is a product of reaction between a hydroxybenzoic acid or an esterified product thereof (that is, hydroxybenzoates) and a polyalkylene glycol, and the esterification degree of hydroxyl groups of the polyalkylene glycol is 50 to 90 mol %. A typical example of the hydroxybenzoate is methyl hydroxybenzoate, ethyl hydroxybenzoate, and the like. The diester diol-containing monomer can be obtained, for example, by the following reaction.

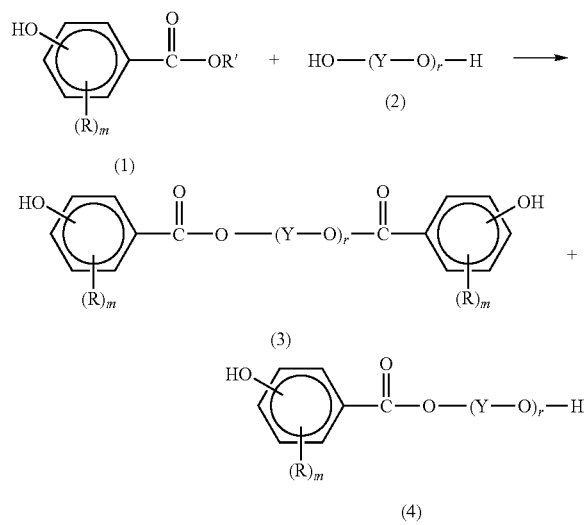

wherein, R is an alkyl group having 1 to 3 carbon atoms; R' is a hydrogen atom or a lower alkyl group; Y is a straight chain or branched alkylene group having 2 to 15 carbon atoms; m is an integer of 0 to 4; r is an integer of 2 to 450.

Namely, through the reaction between a hydroxybenzoic acid or an esterified product thereof represented by general formula (1) and a polyalkylene glycol represented by general formula (2), is obtained a mixture of a diester diol represented by general formula (3) and a monoester diol which is a byproduct and represented by general formula (4). In the above-described general formulas (1), (3), and (4), as an alkyl group which is represented by R can be listed methyl, ethyl, n-propyl, and isopropyl group. When these formulas have two or more R, these R may be different or the same with each other. Among R', methyl group, ethyl group, or propyl group can be listed as a lower alkyl group.

As a straight chain or branched alkylene group having 2 to 15 carbon atoms which is represented by Y in the above-described general formula (2), there can be listed an alkylene group such as ethylene group, propylene group, butylene group, isobutylene group, pentylene group, and isopenthylene group; and an alkylidene group such as ethylidene group, propylidene group, isopropylidene group, butylidene group, isobutylidene group, pentylidene group, and isopentylidene group. n is preferably 2 to 200, more preferably 6 to 70.

As the polyalkylene glycol (polyalkylene ether glycol) represented by the above general formula (2), there can be listed specifically polyethylene glycol, polypropylene glycol, polytetramethylene ether glycol, and the like. In view of availability and hydrophobic property, polytetramethylene ether glycol is particularly preferable. The repeating number of the alkylene ether part of the polyalkylene glycol represented by r is 2 to 200, preferably 6 to 70. When r is 2 or more, a diester diol is copolymerized advantageously at a high efficiency. When r is 70 or less, lowering in heat resistance is also advantageously small.

Any isomers of para-, meta-, and ortho-hydroxybenzoic acid or esterified products thereof can be used, but in view of copolymerization, para- and ortho-isomers are preferable, and para-isomer is particularly preferable.

The reaction between a hydroxybenzoic acid and a polyalkylene glycol is dehydration reaction. For the reaction, toluene, xylene, and the like can be used as a reaction solvent. The reaction is carried out at the boiling temperature of the solvent while water is removed by azeotropic distillation. In this case, a catalyst can be added as appropriate. As the catalyst, there may be mentioned sulfuric acid, phosphoric acid, p-toluene sulfonic acid, an organometallic catalyst of Ti, Sn and the like, and others.

The reaction between an alkyl ester of hydroxybenzoic acid and a polyalkylene glycol is dealcoholization condensation reaction. These two reactants are reacted in an inert gas atmosphere such as a nitrogen gas atmosphere or under reduced pressure while an alcohol corresponding to an alkyl ester thereof is eliminated. The reaction is carried out generally in the absence of solvent. In this case, a catalyst can be added as appropriate. As the catalyst there can be used an organometallic catalyst of Ti, Sn, and the like.

The charge ratio of a hydroxybenzoic acid or art esterified product thereof to a polyalkylene glycol (hydroxybenzoic acid or esterified product thereof/polyalkylene glycol) is not particularly limited, but in view of production efficiency, the charge ratio is preferably 1.5 to 2.4 by molar ratio. The reaction temperature is preferably 180 to 230° C., because an appropriate reaction rate is attained, and raw materials and reaction products are not decomposed. The reaction time is not particularly limited either, but, in view of production efficiency, it is preferred that the reaction conditions be selected so as to limit the reaction time within 10 hrs.

The diester diol-containing monomer used in the present invention has such a requirement that the esterification degree of hydroxyl groups of the polyalkylene glycol is 50 to 90 mol %, preferably 75 to 90 mol %. When the esterification degree is 50 mol % or more, the diester diol-containing monomer contains a sufficient amount of diester diols. While on the other hand, at an esterification degree of 90 mol % or less, failure in separation of the water phase from the organic phase can be avoided when a polycarbonate reaction solution, which is obtained by using a diester diol-containing monomer as a raw material, is washed with water having a pH of 7 or less.

The esterification degree is calculated from the results obtained by $^1$H-NMR measurement, using the following equation.

Esterification degree (mol %)=[integrated value of protons of aliphatic hydroxyl groups at α-position (integrated value of protons of aliphatic hydroxyl groups at α-position+integrated value of protons of ester groups at α-position)]×100

The diester diol-containing monomer used in the present invention contains a hydroxybenzoic acid in an amount of preferably 0.05% by mass, more preferably 0.01% by mass or less. As a method for removing the hydroxybenzoic acid from the diester diol-containing monomer, preferred is a method in which difference in the solubility to water between the hydroxybenzoic acid and the diester diol is used. In this method, temperature, pH, stirring conditions, separation conditions, solvent, and others can be selected as appropriate.

The diester diol-containing monomer used in the present invention contains a hydroxybenzoate in an amount of preferably 110% by mass or less, more preferably 0.5% by mass or less. As a method for removing the hydroxybenzoate from the diester diol-containing monomer, preferred is a method in which the hydroxybenzoate is distilled out by reducing the pressure of the reaction system as is disclosed in Japanese Patent Application Laid-Open (JP-A) No. Shou62-79222.

Further, in another method, it is also effective, after the hydroxybenzoate is alkali-hydrolyzed to a hydroxybenzoic acid, to remove the hydroxybenzoic acid by the above described method.

A hydroxybenzoic acid contained in the diester diol-containing monomer is derived from a raw material used for the synthesis of a diester diol or from a decomposed product of the raw material. Specifically, the hydroxybenzoic acid includes (ortho, meta, or para)-hydroxybenzoic acid, an alkyl-substituted hydroxybenzoic acid, and the like. The alkyl ester of hydroxybenzoic acid is derived from a raw material used for the synthesis of a diester diol. Specifically, the alkyl ester of hydroxybenzoic acid includes methyl (ortho, meta, or para)-hydroxybenzoate, ethyl (ortho, meta, or para)-hydroxybenzoate, propyl (ortho, meta, or para)-hydroxybenzoate, and the like.

A hydroxybenzoic acid and a hydroxybenzoate which are contained as an impurity are quantitatively analyzed by HPLC (high performance liquid chromatography) under the following conditions. The amounts of them are determined based on a calibration curve obtained from a standard sample.

Column: ODS-3 manufactured by GL Sciences Inc.;

Column temperature: 40° C.;

Solvent: a mixed solution of a 0.5% by mass phosphoric acid aqueous solution and acetonitrile with a volume ratio of 1:2;

Flow rate: 1.0 mL/min.

A PC copolymer produced by the method according to the present invention is a diester diol copolymerized polycarbonate and is produced by a conventional method called as interfacial polymerization. That is, in the method, a divalent phenol, the above-mentioned diester diol-containing monomer, and a carbonate precursor such as phosgene are reacted. Specifically, for example, the divalent phenol, the diester diol-containing monomer, and the carbonate precursor such as phosgene are reacted in an inert solvent such as methylene chloride, in the presence of a known acid acceptor or a molecular weight modifier, further optionally by adding a catalyst or a branching agent. For example, according to the present invention, a PC copolymer having the repeating units represented by the following general formulas (1) and (II) can be produced,

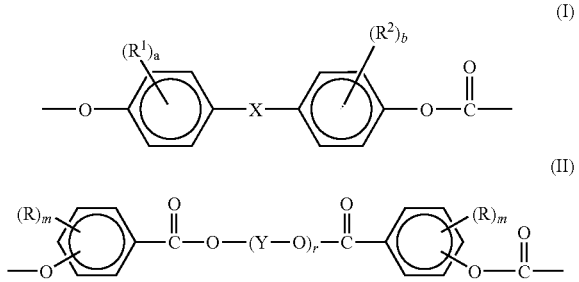

wherein, R, Y, m and Y are the same as described above; $R^1$, $R^2$, X, a, and b will be described below.

As the divalent phenol, there may be mentioned a compound having the following general formula (Ia).

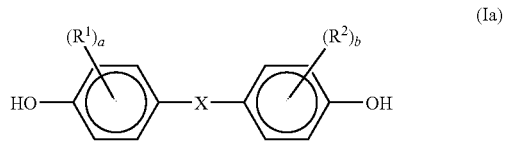

In the general formula (Ia), $R^1$ and $R^2$ are each independently a halogen atom or an alkyl group having 1 to 6 carbon atoms. The halogen atom includes chlorine atom, bromine atom, and the like. The alkyl group can be in any form of straight chain branched, and cyclic. As the alkyl group, there may be mentioned specifically methyl group, ethyl group, n-propyl group, isopropyl group, n-butyl group, isobutyl group tert-butyl group, n-pentyl group, isopentyl group, n-hexyl group, isohexyl group, cyclopentyl group, cyclohexyl group, and the like. a and b represent the substitution number of $R^1$ and $R^2$, respectively, and each is an integer of 0 to 4. When there are two or more $R^1$, these $R^1$ can be different or the same with each other. When there are two or more $R^2$ these $R^2$ can be different or the same with each other.

X represents a single bond; an alkylene group having 1 to 8 carbon atoms such as methylene group, ethylene group, propylene group, butylene group, pentylene group, and hexylene group; an alkylidene group having 2 to 8 carbon atoms such as ethylidene group and isopropylidene group; a cycloalkylene group having 5 to 15 carbon atoms such as cyclopentylene group and cyclohexylene group; a cycloalkylidene group having 5 to 15 carbon atoms such as cyclopentylidene group and cyclohexylidene group; —S—, —SO—, —SO₂—, —O—, and —CO— bond; and a bond represented by the following formula (III-1) or (III-2).

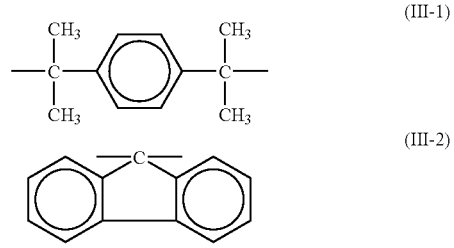

As the divalent phenol represented by the above-described general formula (Ia), there may be mentioned various kinds of divalent phenols, but particularly 2,2-bis(4-hydroxyphenyl) propane, [so called bisphenol A], is preferred. As a bisphenol besides bisphenol A, for example, there can be listed a bis (hydroxyaryl) alkane such as bis(4-hydroxyphenyl)methane, 1,1-bis(4-hydroxyphenyl)ethane, 2,2-bis(4-hydroxyphenyl) butane, 2,2-bis(4-hydroxyphenyl)octane, 2,2-bis(4-hydroxyphenyl)phenylmethane, 2,2-bis(4-hydroxy-3-methylphenyl)propane, bis(4-hydroxyphenyl)naphthylmethane, 1,1-bis (4-hydroxy-t-butylphenyl)propane, 2,2-bis(4-hydroxy-3-bromophenyl)propane, 2,2-bis(4-hydroxy-3,5-tetramethylphenyl)propane, 2,2-bis(4-hydroxy-3-chlorophenyl)propane, 2,2-bis(4-hydroxy-3,5-tetrachlorophenyl)propane, and 2,2-bis(4-hydroxy-3,5-tetrabromophenyl)propane; a bis(hydroxyaryl)cycloalkane such as 1,1-bis(4-hydroxyphenyl)cyclopentane, 1,1-bis(4-hydroxyphenyl)cyclohexane, 1,1-bis(4-hydroxyphenyl)-3,5, 5-trimethylcyclohexane and 2,2'-bis(4-hydroxyphenyl)norbornene, a dihydroxyaryl ether such as 4,4'-dihydroxyphenyl ether and 4,4'-dihydroxy-3,3'-dimethylphenyl ether; a dihydroxydiaryl sulfide such as 4,4'-dihydroxydiphenyl sulfide and 4,4'-dihydroxy-3,3'-dimethyldiphenyl sulfide; a dihydroxydiaryl sulfoxide such as 4,4'-dihydroxydiphenyl sulfoxide and 4,4'-dihydroxy-3,3'-dimethyldiphenyl sulfoxide; a dihydroxydiaryl sulfone such as 4,4'-dihydroxydiphenyl sulfone and 4,4'-dihydroxy-3,3'-dimethyldiphenyl sulfone; a dihydroxydiphenyl such as 4,4'-dihydroxydiphenyl; a dihydroxydiaryl fluorene such as 9,9-bis(4-hydroxyphenyl)fluorene and 9,9-bis(4-hydroxy-3-methylphenyl)fluorene; bis(4-hydroxyphenyl) diphenylmethane; a dihydroxydiaryl adamantane such as 1,3-bis(4-hydroxyphenyl)adamantane, 2,2-bis(4-hydroxyphenyl)adamantane, and 1,3-bis(4-hydroxyphenyl)-5,7-dimethyladamantane: bis(4-hydroxyphenyl)diphenylmethane; 4,4'-[1,3-phenylenebis(1-methylethylidene)]bisphenol, and others. In addition, as the divalent phenol can be also used 0,10-bis(4-hydroxyphenyl)-9-anthrone, 1,5-bis(4-hydroxyphenylthio)-2,3-dioxapentaene, an $\alpha,\omega$-bishydroxyphenyl polydimethyl siloxane compound, and the like. These divalent phenols each can be used alone or as a mixture of two or more kinds.

Various kinds of molecular weight modifiers can be used which are generally used for PC resin polymerization. Specifically, as a monovalent phenol, for example, can be listed phenol, o-n-butylphenol, m-n-butylphenol, p-n-butylphenol, o-isobutylphenol, m-isobutylphenol, p-isobutylphenol, o-t-butylphenol, m-t-isobutylphenol, p-t-butylphenol, o-n-pentylphenol, m-n-pentylphenol, p-n-pentylphenol, o-n-hexylphenol, m-n-hexylphenol, p-n-hexylphenol, p-t-octylphenol, o-cyclohexylphenol, m-cyclohexylphenol, p-cyclohexylphenol, o-phenylphenol, m-phenylphenol, p-phenylphenol, o-n-nonylphenol, m-nonylphenol, p-n-nonylphenol, o-cumylphenol, m-cumylphenol, p-cumylphenol, o-naphthylphenol, m-naphthylphenol, p-naphthylphenol, 2,5-di-t-butylphenol, 2,4-di-t-butylphenol, 3,5-di-t-butylphenol, 2,5-dicumylphenol, 3,5-dicumylphenol, p-cresol, bromophenol, tribromophenol, a monoalkylphenol which has a straight chain or branched alkyl group having an average carbon number of 12 to 35 at ortho-, meta-, or para-position, 9-(4-hydroxyphenyl)-9-(4-methoxyphenyl)fluorene, 9-(4-hydroxy-3-methylphenyl)-9-(4-methoxy-3-methylphenyl) fluorene, 4-(1-adamantyl)phenol, and others. Among these monovalent phenols, suitably used are p-t-butylphenol, p-cumylphenol, and p-phenylphenol.

As the catalyst, a phase-transfer catalyst can be used preferably, which includes, for example, a tertiary amine or a salt thereof, a quaternary ammonium salt, a quaternary phosphonium salt, and the lie. As the tertiary amine, for example, can be listed triethylamine, tributylamine, N,N-dimethylcyclohexylamine, pyridine, dimethylaniline, and the like. As the tertiary amine salt, for example, can be listed the hydrochlorides and bromates of these tertiary amines. As the quaternary ammonium salt, for example, can be listed trimethylbenzylammonium chloride, triethylbenzylammonium chloride, tributylbenzylammonium chloride, trioctylmethylammonium chloride, tetrabutylammonium chloride, tetrabutylammonium bromide, and the like. As the quaternary phosphonium salt, for example, there can be listed tetrabutylphosphonium chloride, tetrabutylphosphonium bromide, and the like. These catalysts can be used alone or in combination of two or more kinds. Among the aforementioned catalysts, tertiary amines are preferable, in particular triethylamine is preferable.

As the inert organic solvent, there may be mentioned various kinds. For example, there can be listed a chlorinated hydrocarbon such as dichloromethane (methylene chloride), trichloromethane, carbon tetrachloride, 1,1-dichloroethane, 1,2-dichloroethane, 111-trichloroethane, 1,1,2-trichloroethane, 1,1,2-tetrachloroethane, 1,1,2,2-tetrachloroethane, pentachloroethane, and chlorobenzene; toluene; and acethophenone. These organic solvents each can be used alone or in a combination of two or more kinds. Among these, in particular methylene chloride is preferable.

As the branching agent, for example, a compound having three or more functional groups can be used such as 1,1,1-tris (4-hydroxyphenyl)ethane, 4,4'-[1-[4-[1-(4-hydroxyphenyl)-1-methylethyl]phenyl]ethylidene]bisphenol, $\alpha,\alpha',\alpha''$-tris(4-hydroxyphenyl)-1,3,5-triisopropylbenzene, 1-[methyl-$\alpha$-(4'-hydroxyphenyl)ethyl]-4-[$\alpha',\alpha'$-bis(4''-hydroxyphenyl)ethyl] benzene, phloroglucin, trimellitic acid, and isatin bis(o-cresol).

In a PC copolymer, the percentage of the repeating unit which is represented by the above-described general formula (II) is preferably 0.1 to 5 mol % in view of the properties of the PC copolymer. In addition, the molar ratio of the residue of the diester diol represented by the above described general formula (3) to the residue of the monoester diol represented by the above described general formula (4), that is (3)/(4), is preferably 80/20 to 50/50. Such a molar ratio can be attained by limiting the esterification degree of the hydroxyl groups of a polyalkylene glycol in the range of 50 to 90 mol %.

EXAMPLES

The present invention will be further described in detail with reference to the following examples, but it should be construed that the invention is in no way limited to those examples.

Production Example 1

Synthesis of a Diester Diol-containing Monomer

In a 100 mL flask equipped with a nitrogen gas inlet tube, a vacuum equipment, a thermometer, and a stirrer were charged 20 g (0.01 mol) of polytetramethylene ether glycol (PTMG, Mn=2000), 2.3 g (0.015 mol) of methyl p-hydroxybenzoate, and 0.01 g of dibutyl tin oxide. Evacuation and nitrogen gas purge were repeated three times and then the reaction mixture was reacted in a nitrogen gas atmosphere while stirring at 220° C. for 4 ins. After the reaction mixture was cooled, the flask was unsealed to obtain a reaction product. The reaction product, that is a diester diol-containing monomer, had an esterification degree of 72 mol %. The above esterification degree was calculated from the result of $^1$H-NMR measurement using the following equation.

Esterification degree (mol %)=[integrated value of protons of aliphatic hydroxyl groups at $\alpha$-position/(integrated value of protons of aliphatic hydroxyl groups at $\alpha$-position+integrated value of protons of ester groups at $\alpha$-position)]×100

The proton of a hydroxyl group at $\alpha$-position of polytetramethylene glycol was observed at 3.6 ppm and the proton of an ester group at $\alpha$-position was observed at 4×3 ppm.

Production Examples 2 to 8

Synthesis of Diester Diol-containing Monomers

Reaction products were obtained in a similar manner to Production Example 1 except that the reaction conditions were changed to the ones shown in Table 1. The esterification degrees of the resulting reaction products (diester diol-containing monomers) are shown in Table 1.

[Table 1]

TABLE 1

|  | Production Example 1 | Production Example 2 | Production Example 3 | Production Example 4 | Production Example 5 | Production Example 6 |
|---|---|---|---|---|---|---|
| Methyl hydroxybenzoate | para-isomer | para-isomer | para-isomer | para-isomer | para-isomer | para-isomer |
| Reaction time (hrs) | 4 | 4 | 4 | 4 | 4 | 4 |
| Charge degrees (mol/mol) | 1.5 | 1.8 | 1.9 | 2.0 | 2.1 | 2.3 |
| Esterification degrees (mol %) | 72 | 78 | 80 | 87 | 88 | 93 |

Example 1

Production of a Polycarbonate Copolymer (1) Synthesis Step for PC Oligomer

A sodium hydroxide aqueous solution of bisphenolA (BPA) was prepared by dissolving 13.5% by mass of BPA in a 5.6% by mass sodium hydroxide aqueous solution. Through a tubular reactor having an inside diameter of 6 mm and a length of 30 m, the above sodium hydroxide aqueous solution of BPA was passed at a flow rate of 40 L/hr and methylene chloride was passed at a flow rate of 15 L/hr, both continuously, and also phosgene was passed continuously at a flow rate of 4.0 kg/hr. The tubular reactor was equipped with a jacket through which cooling water was passed so as to keep the temperature of the reaction solution at 40° C. or lower.

The reaction solution discharged from the tubular reactor was introduced continuously into a baffled tank reactor with an inside volume of 40 L equipped with sweptback blades; further, to the tank reactor, the sodium hydroxide aqueous solution of BPA was supplied at a flow rate of 2.8/hr, a 25% by mass sodium hydroxide aqueous solution at a flow rate of 0.07 L/hr, water at a flow rate of 17 L/hr, and a 1% by mass triethylamine aqueous solution at a flow rate of 0.64 L/hr; the reaction was continued at a temperature between −9 and 32° C. The reaction solution was drawn out of the tank reactor continuously, and was settled so as to separate and remove the resulting water phase and to collect the resulting methylene chloride phase. Thus obtained polycarbonate oligomer solution had an oligomer concentration of 329 g/L and a chloroformate group concentration of 0.74 mol/L.

(2) Polymerization Step for PC Copolymer

In a tank reactor with an inside volume of 1 L equipped with baffle plates and paddle-type stirring blades, were charged 274 mL of the oligomer solution obtained in the above step (1), 156 mb of methylene chloride, and 10 g of the diester diol-containing monomer obtained in Production Example 1. After 168 μL of triethylamine was further charged, 19.2 g of a 6.4% by mass sodium hydroxide aqueous solution was added while stirring and then the resulting mixture was reacted for 10 min.

Further, 1.40 g of p-tert-butylphenol dissolved in 20 mL of methylene chloride and 16.1 g of SPA dissolved in 142 mL of a 6.4% by mass sodium hydroxide aqueous solution were added, and polymerization was continued for 50 mm.

(3) Washing Step

To the reaction solution obtained in the above step (2) was added 200 mL of methylene chloride. After stirring for 10 min the reaction solution was centrifugally separated into a water phase and an organic phase. The organic phase was charged into the above-described tank reactor with an inside volume of 1 L. A 0.03 mol/L sodium hydroxide aqueous solution was added in a manner that the sodium hydroxide aqueous solution made up 15% by volume of the whole solution. After the whole solution was washed by stirring, it was separated centrifugally into a water phase and an organic phase.

Next, in a similar manner, the organic phase was washed with a 0.2 mol/L hydrochloric acid. While the whole solution was being stirred, 50 mL of it was taken out, poured into a 50 mL measuring cylinder, and settled. Time measurement was started immediately after settling was started, and the amount of the water phase separated from the solution after 30 min was measured, which was used as a measure for evaluating separation of a PC polymer. Thus obtained separation is shown in FIG. 1 together with the results of Examples 2 to 5 and Comparative Example 1 which will be described later.

The remaining organic phase was further washed with purified water twice, and the electrical conductivity of the resulting water phase after washing was confirmed to be reduced to 0.01 μS/m or less.

(4) Flaking Step

The methylene chloride solution containing the PC copolymer obtained in the above step (3) was concentrated and pulverized into flakes, which were then dried under reduced pressure at 100° C.

The viscosity number of the resulting PC copolymer was measured in accordance with the ISO 1628-4 (1999) standard. The results are shown in Table 2. The amount of the repeating unit represented by the above-described general formula (II) was 0.6 mol % in the resulting PC copolymer, which is represented as "(II) copolymerization ratio" in Table 2. In the PC copolymer, the ratio of the diester diol residue represented by general formula (3) to the monoester diol residue represented by general formula (4) is 45/55, which is represented as (3)/(4) in Table 2.

Examples 2 to 5 and Comparative Example 1

PC copolymers were obtained in a similar manner to Example 1 except that the reaction product obtained in Production Example 1 in Example 1 was replaced by the reaction products shown in Table 2. The evaluation results obtained in a similar manner to Example 1 are shown in Table 2.

[Table 2]

TABLE 2

|  | Example 1 | Example 2 | Example 3 | Example 4 | Example 5 | Comparative Example 1 |
|---|---|---|---|---|---|---|
| Diester oil | Production Example 1 | Production Example 2 | Production Example 3 | Production Example 4 | Production Example 5 | Production Example 6 |
| PC copolymer |  |  |  |  |  |  |
| (II) Copolymerization ratio (mol %) | 0.6 | 0.6 | 0.7 | 0.8 | 0.8 | 0.9 |
| (3)/(4) (mol/mol) | 45/55 | 55/45 | 60/40 | 75/25 | 75/25 | 85/15 |
| Viscosity number | 44.6 | 45.4 | 45.4 | 46.0 | 45.8 | 46.1 |
| Separation (mL) | 6.5 | 6.5 | 6.5 | 4.5 | 3.5 | 0.0 |

INDUSTRIAL APPLICABILITY

According to the present invention, a PC copolymer having a specific structure can be produced with improved productivity by using a diester diol-containing monomer as a raw material.

The invention claimed is:

1. A method for producing a polycarbonate copolymer comprising repeating units represented by the following formulas (I) and (II):

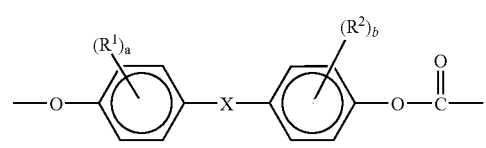

(I)

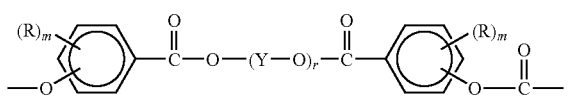

(II)

where:
R$^1$ and R$^2$ are each independently a halogen atom or an alkyl group having 1 to 6 carbon atoms;
when there are two or more R$^1$s, each R$^1$ can be different from or the same as the other(s);
when there are two or more R$^2$s, each R$^2$ can be different from or the same as the other(s);
a and b are each independently an integer from 0 to 4; and
X represents a single bond, an alkylene group having 1 to 8 carbon atoms, an alkylidene group having 2 to 8 carbon atoms, a cycle alkylidene group having 5 to 15 carbon atoms, —S—, —SO—, —SO$_2$—, —O—, —CO—, or a bond represented by the following formula (III-1) or (III-2):

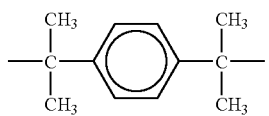

(III-1)

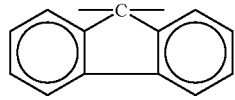

(III-2)

where:
R is an alkyl group having 1 to 3 carbon atoms;
Y is a straight chain or branched alkylene group having 2 to 15 carbon atoms;
m is an integer of 0 to 4; and
r is an integer of 2 to 450;
the method comprising:
reacting a diester diol-containing monomer, a divalent phenol, and a carbonate precursor by interfacial polymerization, wherein;
the diester diol-containing monomer is a mixture of a diester diol according to the following formula (3) and a monoester diol represented by the following formula (4)

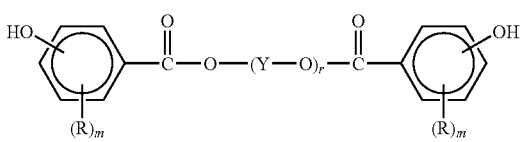

(3)

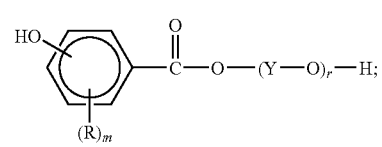

(4)

the mixture is obtained by reaction of a hydroxybenzoic acid or an esterified product thereof represented by the following formula (1) and a polyalkylene glycol represented to by the following formula (2):

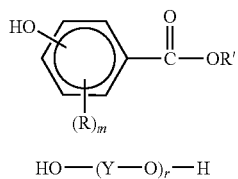

(2)

HO—(Y—O)$_r$—H where R' is a hydrogen or a lower alkyl group;
an esterification degree of hydroxyl groups of the polyalkylene glycol is 50 to 90 mol %.

2. The method for producing a polycarbonate copolymer according to claim 1, wherein the esterification degree is 75 to 90 mol %.

3. The method for producing a polycarbonate copolymer according to claim 1, wherein the hydroxybenzoic acid or the esterified product thereof is p-hydroxybenzoic acid or the esterified product thereof.

4. The method for producing a polycarbonate copolymer according to claim 1, wherein the hydroxybenzoic acid or the esterified product thereof is o-hydroxybenzoic acid or the esterified product thereof.

5. The method for producing a polycarbonate copolymer according to claim 1, wherein the amount of a hydroxybenzoic acid contained as an impurity in the diester diol-containing monomer is 0.05% by mass or less.

6. The method for producing a polycarbonate copolymer according to claim 1, wherein the amount of a hydroxybenzoate contained as an impurity in the diester diol-containing monomer is 1.0% by mass or less.

7. A polycarbonate copolymer produced by the method according to claim 1.

* * * * *